(12) United States Patent
Sutter, Jr. et al.

(10) Patent No.: US 8,979,203 B1
(45) Date of Patent: Mar. 17, 2015

(54) HEAD RESTRAINT ASSEMBLY

(71) Applicants: Robert R. Sutter, Jr., Rockford, MI (US); Craig A. Ulman, Rockford, MI (US); Brian C. Leja, Kentwood, MI (US); Michael J. Boks, Grand Rapids, MI (US)

(72) Inventors: Robert R. Sutter, Jr., Rockford, MI (US); Craig A. Ulman, Rockford, MI (US); Brian C. Leja, Kentwood, MI (US); Michael J. Boks, Grand Rapids, MI (US)

(73) Assignee: Gill Industries, Inc., Grand Rapids, MI (US)

( * ) Notice: Subject to any disclaimer, the term of this patent is extended or adjusted under 35 U.S.C. 154(b) by 0 days.

(21) Appl. No.: 13/768,677

(22) Filed: Feb. 15, 2013

Related U.S. Application Data (60) Provisional application No. 61/637,514, filed on Apr. 24, 2012.

(51) Int. Cl.
*A47C 7/36* (2006.01)
*B60N 2/48* (2006.01)

(52) U.S. Cl.
CPC ............ *B60N 2/4838* (2013.01); *B60N 2/4841* (2013.01); *B60N 2/4847* (2013.01)

USPC .......................................... 297/408

(58) Field of Classification Search
USPC .......................................... 297/408
See application file for complete search history.

(56) References Cited

U.S. PATENT DOCUMENTS

| | | | |
|---|---|---|---|
| 6,000,760 A * | 12/1999 | Chung | 297/408 |
| 2004/0108766 A1 * | 6/2004 | Baker et al. | 297/408 |
| 2007/0164593 A1 * | 7/2007 | Brockman | 297/408 |
| 2007/0170766 A1 * | 7/2007 | Brawner | 297/408 |
| 2009/0021068 A1 * | 1/2009 | Yamane et al. | 297/408 |
| 2014/0210244 A1 * | 7/2014 | Tobata et al. | 297/408 |
| 2014/0210245 A1 * | 7/2014 | Tobata et al. | 297/408 |

* cited by examiner

*Primary Examiner* — David E Allred
(74) *Attorney, Agent, or Firm* — Dickinson Wright PLLC (57) ABSTRACT

A head restraint assembly, comprising: a support for mounting the head restraint above a seat back; a bun assembly pivotally mounted on the head restraint support for movement in first and second directions relative to the head restraint support; and an adjustment mechanism disposed at least substantially within the bun assembly, the adjustment mechanism operative to permit (i) the selective pivotal movement of the bun assembly in either of the first and second directions and, as the bun assembly is moved in either of the first and second directions, (ii) the incremental positioning of the bun assembly in any of a plurality of predefined positions along a path of travel of the bun assembly in the first and second directions.

9 Claims, 11 Drawing Sheets

HEAD RESTRAINT ASSEMBLY

CROSS-REFERENCE TO RELATED APPLICATIONS

This application is related to, and claims the benefit of priority from, U.S. Provisional Patent Application Ser. No. 61/637,514, filed 24 Apr. 2012, the disclosure of which application is incorporated herein by reference in its entirety.

FIELD OF THE INVENTION

The invention relates generally to head restraints, such as, for instance, employed in vehicles, and, more particularly, to foldable head restraints.

BACKGROUND

Head restraint assemblies, which generally comprise a headrest component—commonly called a bun—adjustably supported on the top of a seat-back, protect a vehicle occupant from serious injury due to sudden acceleration or deceleration of the vehicle. Conventionally, head restraints are adjustable relative to the seat-back both vertically as well as forwardly and rearwardly in order to permit their proper positioning for the occupant. Forward and rearward adjustment is typically accomplished with a ratchet-style mechanism which, upon occupant actuation of a release means (such as, for instance, a button or lever), releases the ratchet mechanism to permit the head restraint to move under spring bias to a full-forward position. From this position, the head restraint can be moved reardwardly into one of a plurality of intermediate positions, each defined by the ratchet mechanism. Because of this construction, it is possible for the ratchet mechanism to be inadvertently released, such as in the event of a rear impact, and moved forward to a position that may enhance the risk of occupant injury.

SUMMARY OF THE DISCLOSURE

There is disclosed a head restraint assembly, comprising: a support for mounting the head restraint above a seat back; a bun assembly pivotally mounted on the head restraint support for movement in first and second directions relative to the head restraint support; and an adjustment mechanism disposed at least substantially within the bun assembly, the adjustment mechanism operative to permit (i) the selective pivotal movement of the bun assembly in either of the first and second directions and, as the bun assembly is moved in either of the first and second directions, (ii) the incremental positioning of the bun assembly in any of a plurality of predefined positions along a path of travel of the bun assembly in the first and second directions.

In one form thereof, the adjustment mechanism comprises: a plurality of stationary teeth provided on the head restraint support, the stationary teeth defining the plurality of predefined positions along the path of travel of the bun assembly in the first and second directions; a toothed pawl member moveable between an engaged position, in which one or more of the teeth of the pawl member are engaged with one or more of the stationary teeth, and a disengaged position, in which the teeth of the pawl member are disengaged from the stationary teeth; and a link member moveable between first and second positions, the first position characterized in that the link member maintains the toothed pawl member in the engaged position thereof, and the second position characterized in that the link member moves the toothed pawl member into the disengaged position thereof.

According to one feature, the link member may be biased to the first position thereof. This may be accomplished, in one form, via a spring which biases the link member to the first position thereof.

The present invention may further comprise a user-actuatable actuator selectively operable to move the link member between the first and second positions thereof.

In one form, the actuator is rectilinearly moveable in first and second directions and includes a cam surface; the link member is rotatably moveable, in a plane generally normal to the axis of the rectilinear movement of the actuator, between the first and second positions thereof; and a portion of the link member co-acts with the cam surface of the actuator during rectilinear movement thereof in the first and second directions to effect movement of the link member between the first and second positions thereof.

According to another feature, the plurality of stationary teeth provided on the head restraint support may be defined on a stationary toothed member provided on the head restraint support. The stationary toothed member may, per another feature, include an opening shaped to conform to a portion of a surface of the head restraint support. Further, the stationary toothed member and the head restraint may be made of metal, according to which feature the stationary toothed member may also be welded to the head restraint.

Per yet another feature, the toothed pawl member is rotatably moveable between the engaged and disengaged positions thereof, and includes an arm portion; and the link member is rotatably moveable between the first and second positions thereof. In movement of the link member from the first position to the second position thereof, the link member abuts the arm of the pawl member to urge the pawl member to the disengaged position thereof.

According to a still further feature, the present invention may comprise a frame assembly on which is carried the link member, actuator, and pawl member. The frame assembly may, according to one form of the invention, comprise at least first and second, spaced-apart plate members, each plate member pivotally mounted on the head restraint support; and wherein further the link member and pawl member are rotatably disposed on the same one of the at least first or second plate members, and the actuator extends between the at least first and second plate members and is rectilinearly moveable relative thereto.

In one embodiment of the invention, the toothed pawl member is rectilinearly moveable between the engaged and disengaged positions thereof. According to one feature of this embodiment, the toothed pawl member is rectilinearly moveably disposed in a track disposed on the bun assembly. Per yet another feature of this embodiment, the link member is rotatably moveable between the first and second positions thereof, and includes therein an opening slidingly receiving therein a guide element of the pawl member. In movement of the link member from between the first and second positions thereof, the link member carries the guide element of the pawl member to urge the pawl member between the engaged and disengaged positions thereof. According to yet another feature of this embodiment, the actuator is rectilinearly moveable in first and second directions, and is connected to the link member so that movement of the actuator in the first and second directions effects corresponding movement of the link member between the first and second positions thereof.

DETAILED DESCRIPTION

Referring first to FIGS. 1 through 6D, wherein like numerals indicate like or corresponding parts throughout the several views, the present invention may be seen to comprise, according to a first exemplary embodiment, a head restraint assembly comprising a support (indicated generally at 11 in FIG. 2) for mounting the head restraint above a seat back; a bun assembly (indicated generally at 15 in FIG. 2, with the core structure therefor being shown in dashed lines and the bun cover not depicted) pivotally mounted on the head restraint support for movement in first, forward A and second, rearward B directions relative to the head restraint support 11; and an adjustment mechanism (indicated generally in the encircled area 20 of FIG. 2) disposed at least substantially within the bun assembly. The adjustment mechanism is operative to permit the selective pivotal movement of the bun assembly 15 in either of the first A and second B directions and, as the bun assembly 15 is moved in either of the first A and second B directions, the incremental positioning of the bun assembly 15 in any of a plurality of predefined positions along the path of travel of the bun assembly 15 in the first A and second B directions.

While the following exemplary embodiments of the invention are described in the specific operational environment of a head restraint assembly for a vehicle, such as an automobile, it will be appreciated that the present invention may be adapted to other seating systems, as well.

Head restraint support 11 may be of conventional construction, comprising, as shown by way of example and not limitation, a pair of spaced-apart vertical supports 12 connected by a horizontally-disposed support 13. Per convention, the free, lower ends (not visible) of supports 12 are received in head restraint guides (not depicted) provided in the top of the vehicle seat-back (not shown). Supports 12, 13 may be made of metal, polymer, polymer-coated metal or other materials suitable to the purpose. Head restraint support 11 may be monolithic or, as shown in the embodiment of FIGS. 1 through 6D, comprised of multiple elements that are assembled in conventional fashion into a unitary whole. Of course, the head restraint support may be comprised of fewer or more supports, and of different configurations, than those depicted (12, 13) in the exemplary embodiment.

Figure 1:
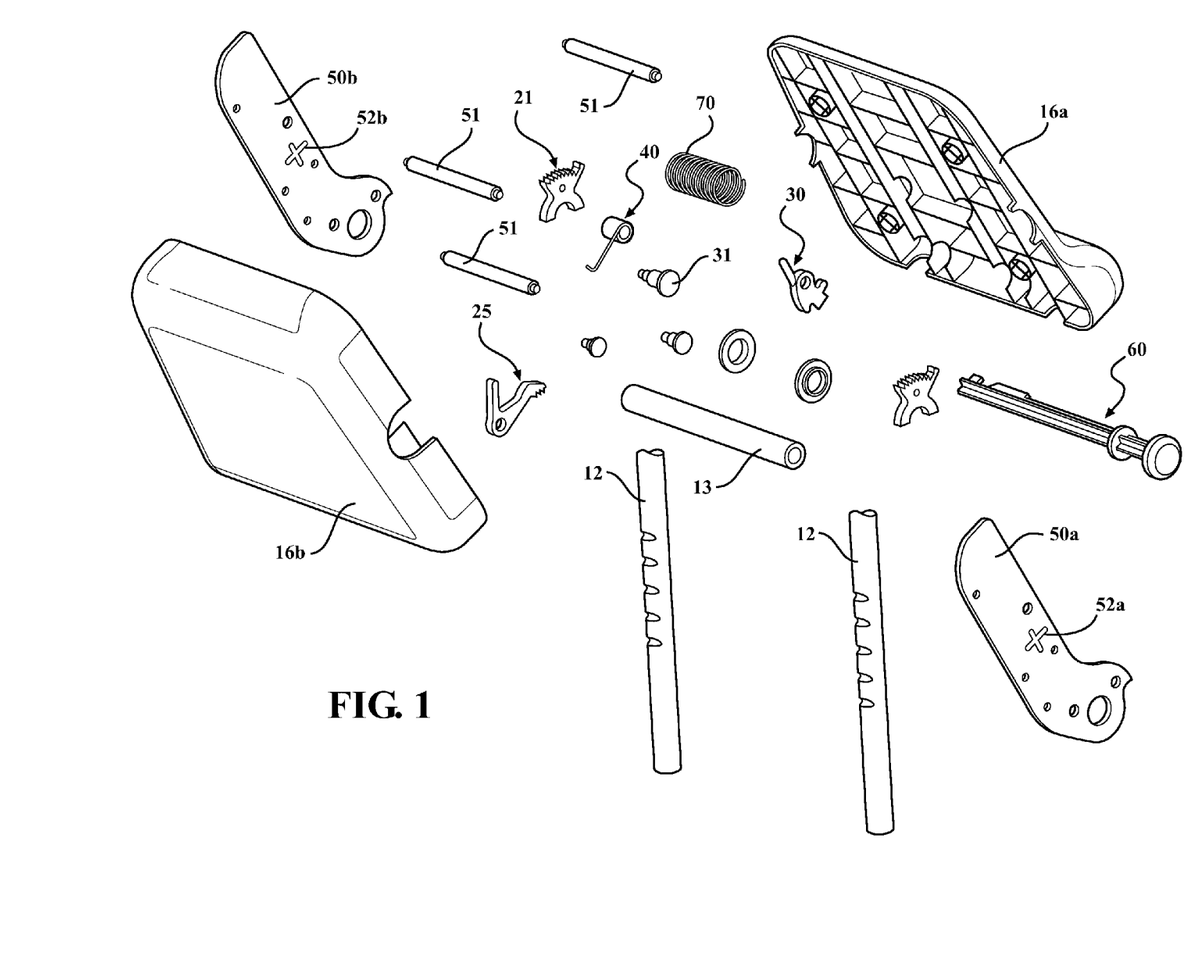
FIG. 1 is an exploded perspective view of a first exemplary embodiment of the head restraint assembly of the present invention.
Figure 2:
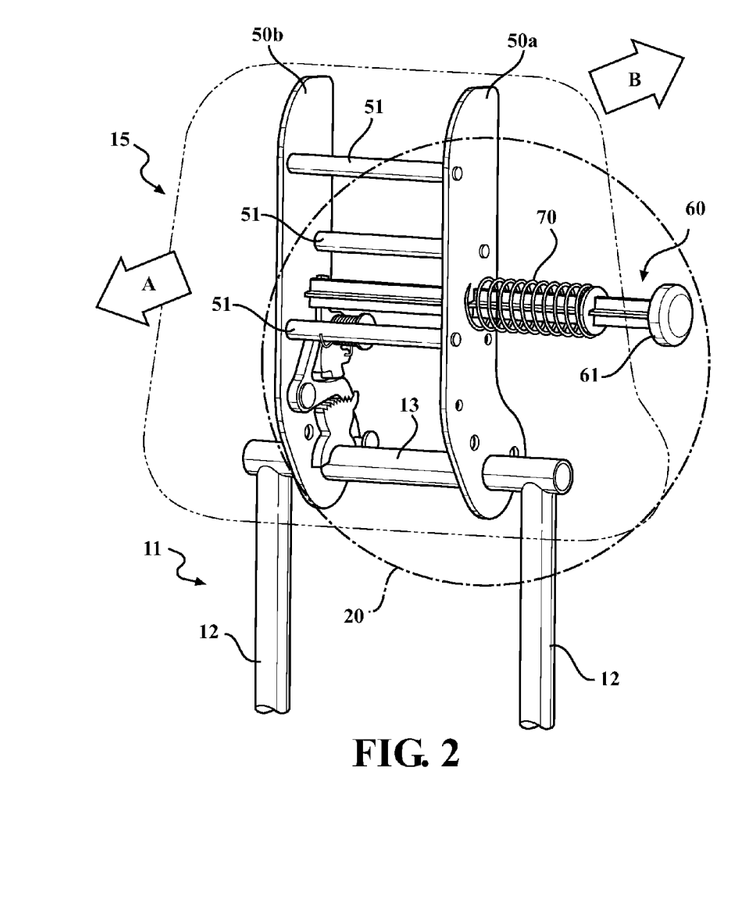
FIG. 2 is a perspective view of the head restraint of FIG. 1, with a portion of the core structure of the bun assembly shown in in dashed lines.
Figure 3:
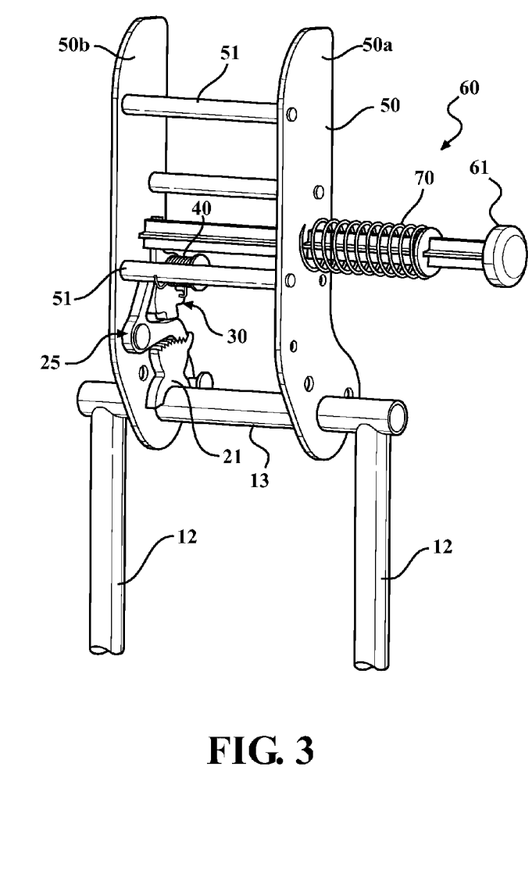
FIG. 3 is a perspective view of the head restraint assembly of FIG. 1, with the bun cover and a portion of the bun core-structure removed.

As best shown in FIG. 1, the bun assembly is, according to the first exemplary embodiment, comprised of a core structure having first 16a and second 16b mateable halves in which is disposed a frame assembly and the adjustment mechanism as described further below. The frame assembly more particularly comprises spaced-apart plate members 50a, 50b interconnected by a plurality of structurally reinforcing cross-bars 51. Each plate member 50a, 50b is pivotally mounted on the horizontally-oriented support 13 to permit selective movement of the head restraint assembly in the manner hereafter described. Each of first 16a and second 16b mateable halves, plate members 50a, 50b and cross-bars 51 may be fashioned from metal, a suitable polymer, such as ABS plastic, for instance, or other suitable material.

As will be appreciated by those skilled in the art, the bun assembly 15 further comprises a cover (not depicted) of fabric or other material, which cover is disposed over the first 16a and second 16b mateable halves with a suitable padding material (e.g., foam) disposed in between.

Of course, those skilled in the art will appreciate that the foregoing bun assembly is exemplary only, and that modifications thereto are possible which would accommodate and permit the operation of the adjustment mechanism 20 as herein described, as well as variations thereof.

In the illustrated embodiment of FIGS. 1 through 6D, the adjustment mechanism may be seen to more particularly comprise a plurality of stationary teeth 22 provided on the head restraint support, the stationary teeth 22 defining the plurality of predefined positions along the path of travel of the bun assembly 15 in the first A and second B directions. A toothed pawl member 25 is moveable (rotatably, in the illustrated embodiment, about the axis defined by pin or axle 27) between a first, engaged position (see, e.g., FIG. 6A through 6C), in which the teeth 26 of the pawl member 25 are engaged with the stationary teeth 22, and a second, disengaged position (see, e.g., FIG. 6D), in which the teeth 26 of the pawl member 25 are disengaged from the teeth 22. A link member 30 is moveable between first and second positions, the first position (see, e.g., FIG. 6A through FIG. 6C) characterized in that the link member 30 maintains the toothed pawl member 25 in the first, engaged position thereof, and the second position (see, e.g., FIG. 6D) characterized in that the link member 30 moves the toothed pawl member 25 into the second, disengaged position thereof.

In the embodiment of FIGS. 1 through 6D, the stationary teeth 22 provided on the head restraint support 11 are defined on a stationary toothed member 21 provided on the head restraint support. Stationary toothed member 21 is fixed to the support 13, with the teeth 22 of the stationary toothed member 21 defining the plurality of predefined positions for the bun assembly, as explained more fully below. According to the illustrated embodiment, stationary toothed member 21 may be seen to comprise a monolithic element defining a semi-circular opening shaped to conform to the shape of the support 13. By this construction, toothed member 21 may be fixed directly to the surface of the support 13, rather than having to be threaded thereover as would be the case if the toothed member 21 included a circular opening corresponding to the diameter of the support 13. According to this illustrated construction of the toothed member 21, the toothed member is either fixed to the support 13 with a suitably strong adhesive or the toothed member and support 13 are made of the same or complimentary materials which can be secured together by welding. In the illustrated embodiment, support 13 and toothed member 21 are made of a suitable metal, with the toothed member being welded to the support 13 to securely fix the toothed member thereto.

It will be appreciated that the toothed member 21 may take forms other than those mentioned herein, subject only to the requirement that the adjustment mechanism operate as broadly described.

Alternatively, it will be appreciated from this disclosure that the stationary teeth 22 may be defined integrally with the head restraint support 11, such as, for instance and without limitation, being formed with the support 13.

Per the exemplary first embodiment, link member 30 is biased to the first position, such as by a torsion spring 40, as shown, secured at one end to the link member 30 and at the other end biased against a cross-bar 51 of the frame assembly (described below). (See, e.g., FIGS. 2 through 5.)

The adjustment mechanism further includes an actuator (shown generally at 60), operable by a user, such as the vehicle occupant, to move the link member 30 between the first and second positions thereof.

As depicted in the exemplary embodiment of FIGS. 1 through 6D, each of the link member 30, pawl member 25, and actuator 60 are carried on one of the plate members 50a, 50b of the bun assembly. Each of link member 30 and pawl member 25 are movably secured to the plate member 50a by means of pins or axles 31 and 27, respectively, so as to be rotatable about these points.

Actuator 60 is, as shown, reciprocally moveably received through openings in each plate member 50a, 50b. Actuator 60 is biased to a default position (best depicted in FIG. 4) by a spring, such as the illustrated coil spring 70, or other means. A first end of the actuator 60 includes a "button" 61 that is accessible to the user through an opening in the bun assembly. "Button" 61 is, by way of example, dimensioned to be pushed by a user's finger.

Figure 4:
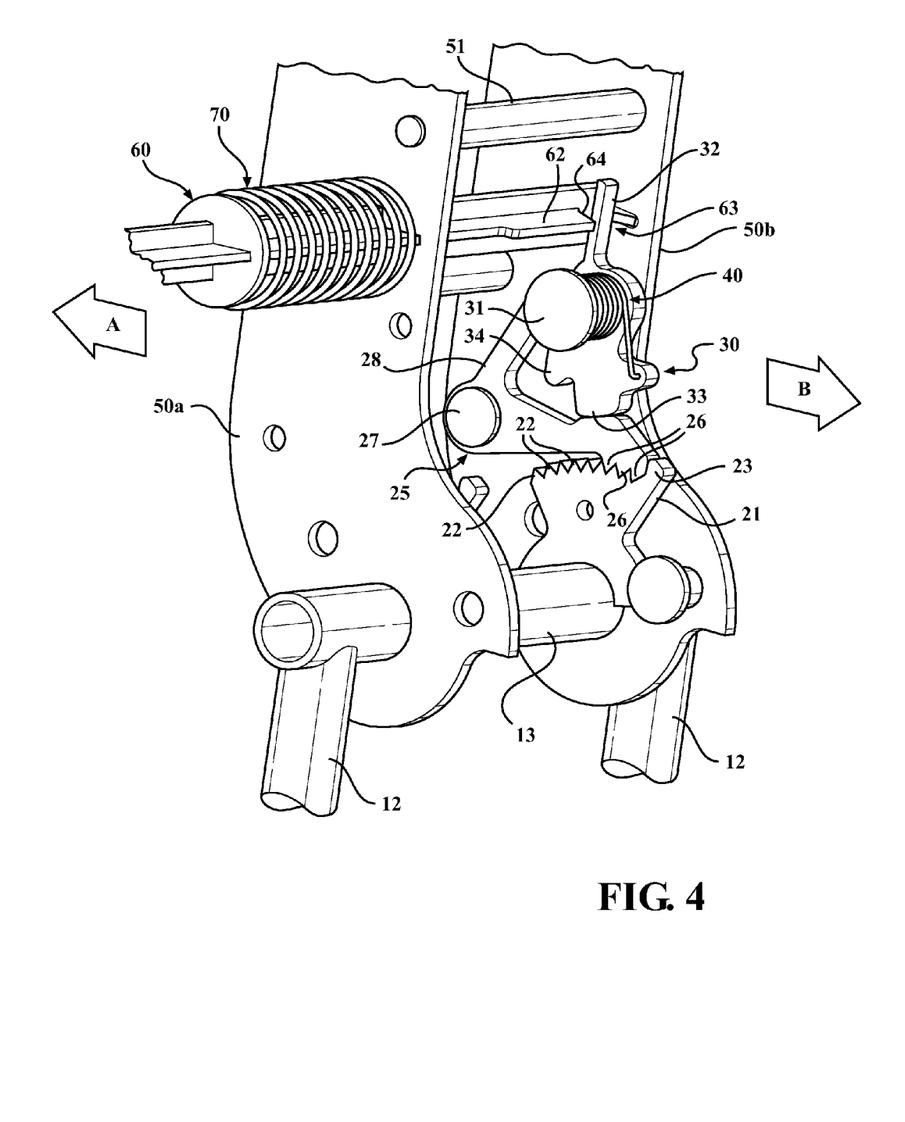
FIGS. 4 and 5 are detailed perspective views of the adjustment mechanism of the head restraint assembly of FIG. 1.
Figure 5:
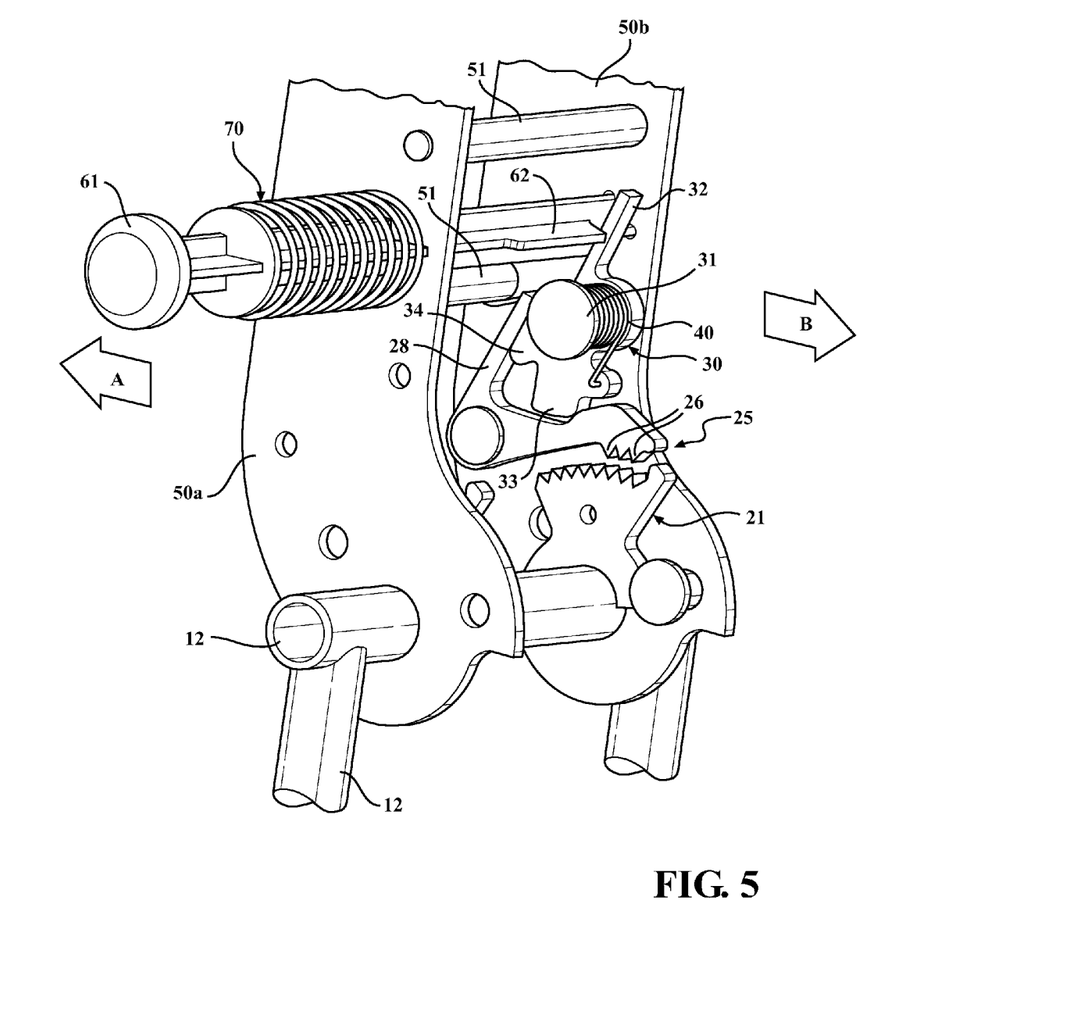

With particular reference being had to FIGS. 4 and 5, the opposite, second end of the actuator 60 includes a laterally projecting flange 62 that terminates in a cut-out area 63 defining a cam surface 64. Within this cut-out area 63 extends a portion 32 of link member 30. Portion 32 has a surface complimentary to, and co-acting with, the cam surface 64 in the manner hereafter described.

With continuing reference to FIGS. 4 and 5, link member 30 is shaped to define two projections 33, 34, as shown. In the first position thereof (shown in FIG. 4), projection 33 abuts a portion of pawl member 25 to maintain the pawl member 25 in the first, engaged position thereof (i.e., in which the teeth 26 are engaged with teeth 22 of the stationary toothed member 21). As the link member 30 moves into the second position thereof upon actuation of actuator 60, the second projection 34 abuts a surface of the arm 28 of pawl member 25 (see FIG. 5). With continued movement of the link member 30, the pawl member 25 is moved into the second, disengaged position thereof (i.e., in which the teeth 26 are out of engagement with the teeth 22 of the stationary toothed member 21).

It is contemplated that the actuator may be other than as described herein with respect to either embodiment of the present invention. More specifically, those skilled in the art will appreciate, with the benefit of this disclosure, that the actuator may be modified as required, such as in response to design constraints, etc., subject only to the requirement of ultimately effecting movement of the pawl member 25. Relatedly, it will be understood with the benefit of this disclosure that the link member 30 may also be other than as described herein, and, it is contemplated, may even be part of the actuator, subject, again, only to the requirement of ultimately effecting movement of the pawl member 25.

Referring specifically to FIGS. 4, 5 and 6A through 6D, the head restraint assembly according to the above-described embodiment works as follows in operation: With the bun assembly in any given position, a user may depress the "button" 61 of actuator 60. This action drives the actuator 60 inwardly against the biasing force of spring 70. In response to this inward movement, cam surface 64 acts against the complimentary surface of portion 32 to drive link member 30, against the biasing force of spring 40, outwardly away from the actuator 60 and into engagement with the outer edge of flange 62 (see FIG. 5). As will be appreciated, portion 32 of link member is retained in this biased position so long as the actuator 60 remains depressed by the application of user force against the "button" 61.

Figure 6A:
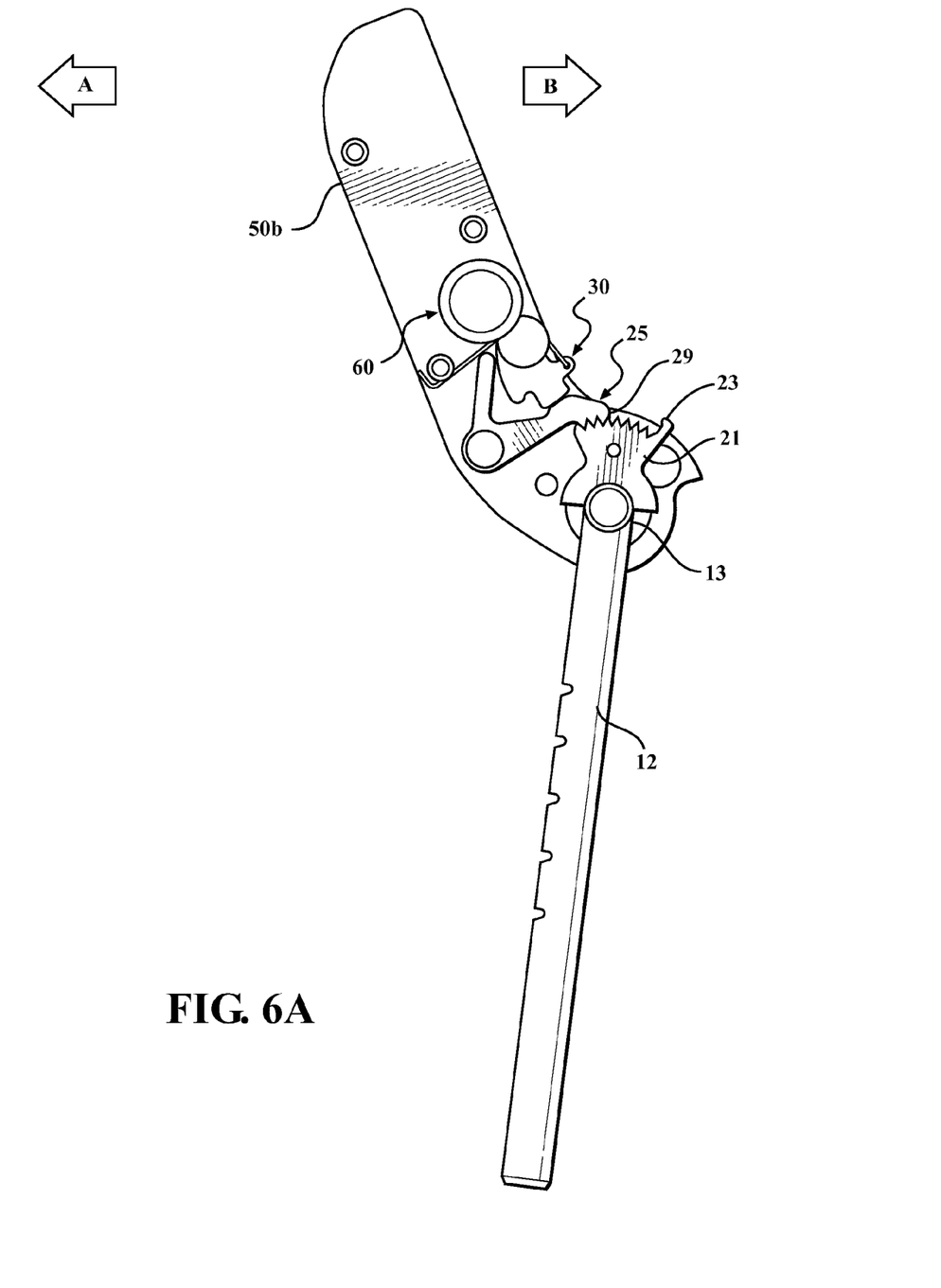
FIGS. 6A through 6D are cross-sectional views of the head restraint assembly of FIG. 1, each figure depicting various conditions of the adjustment mechanism.
Figure 6B:
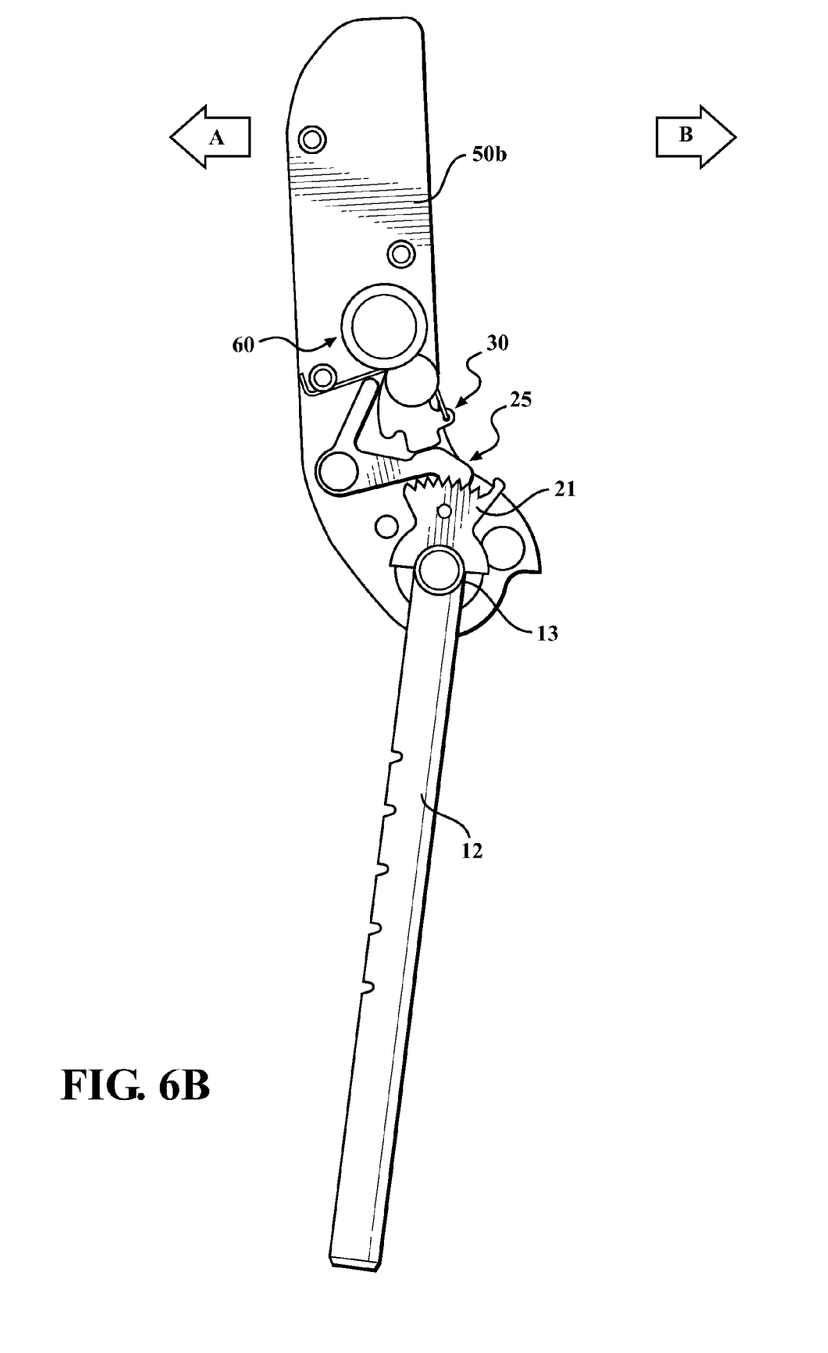
Figure 6C:
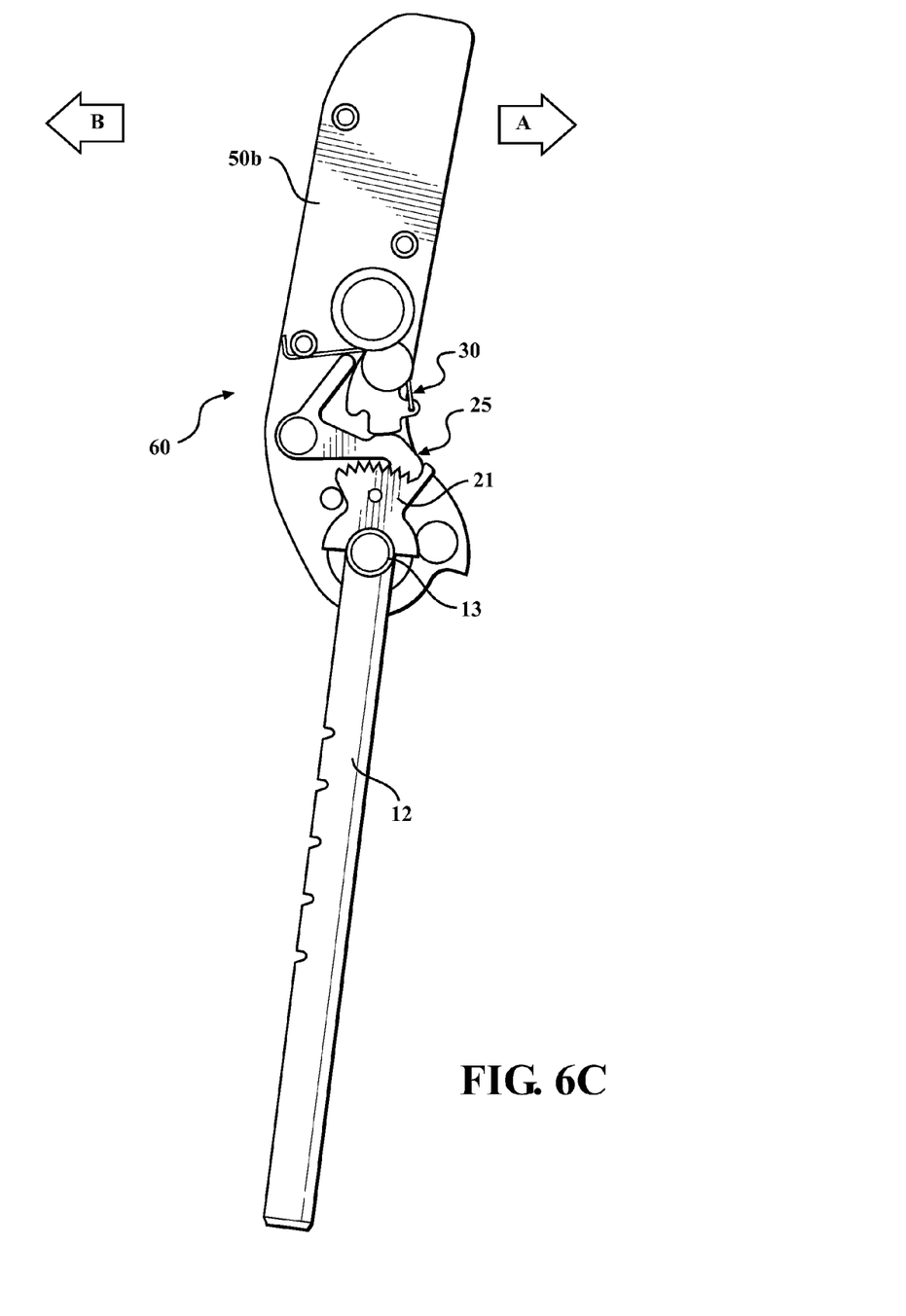
Figure 6D:
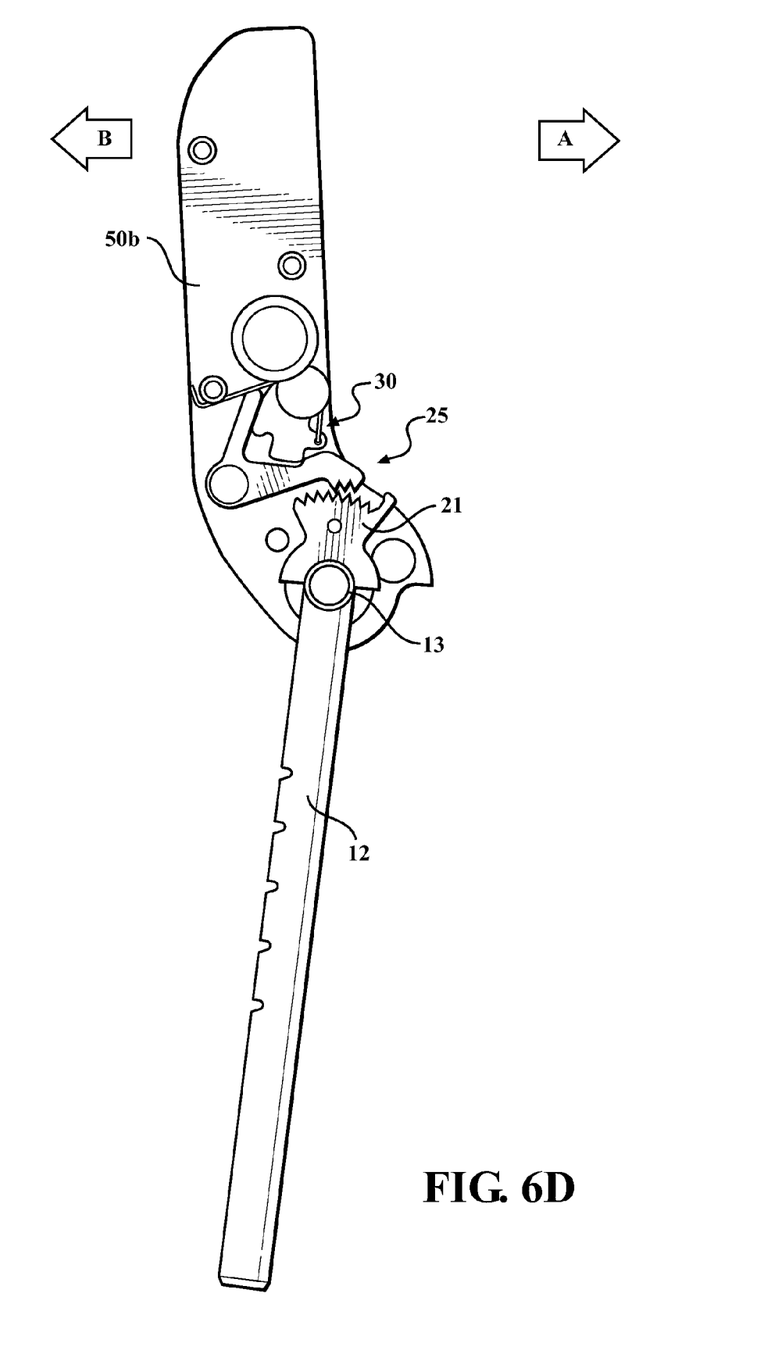

As link member 30 is moved into the biased position, the second projection 34 thereof abuts arm 28 of pawl member 25 to pivot the pawl member counter-clockwise (in the drawings), thus taking the teeth 26 thereof out of engagement with the teeth 22 of stationary toothed member 21 (see FIGS. 5 and 6D). In this second position of the pawl member 25, the user can move the bun assembly in either the forward first A or rearward second B directions, incrementally adjusting the position of the bun assembly in either direction to any of the positions defined by the teeth 22 of the stationary toothed member 21. Exemplary positions are shown in each of FIGS. 6A (where the bun assembly is in the fully forward position), 6B (where the bun assembly is in an intermediate position) and 6C (where the bun assembly is in the fully rearward position).

Once the bun assembly is in a desired position, the user simply releases the actuator 60, which is biased by the spring 70 to a default position (see, e.g. FIG. 4) in which link member 30 (biased by spring 40 to rotate counter-clockwise) is oriented so that the second projection 34 is received in the cut-out area 63 of the actuator 60. In this position, relatedly, projection 33 abuts a portion of pawl member 25 to maintain the pawl member 25 in the first position thereof (i.e., in which the teeth 26 are engaged with teeth 22 of the stationary toothed member 21).

By virtue of the upwardly extending stop 23 of the toothed member 21 and opposing surface 29 on the pawl member 25, which elements are in opposition even when the pawl member 25 is in the second position thereof, movement of the bun assembly in the second, rearward direction B is limited.

Figure 7:
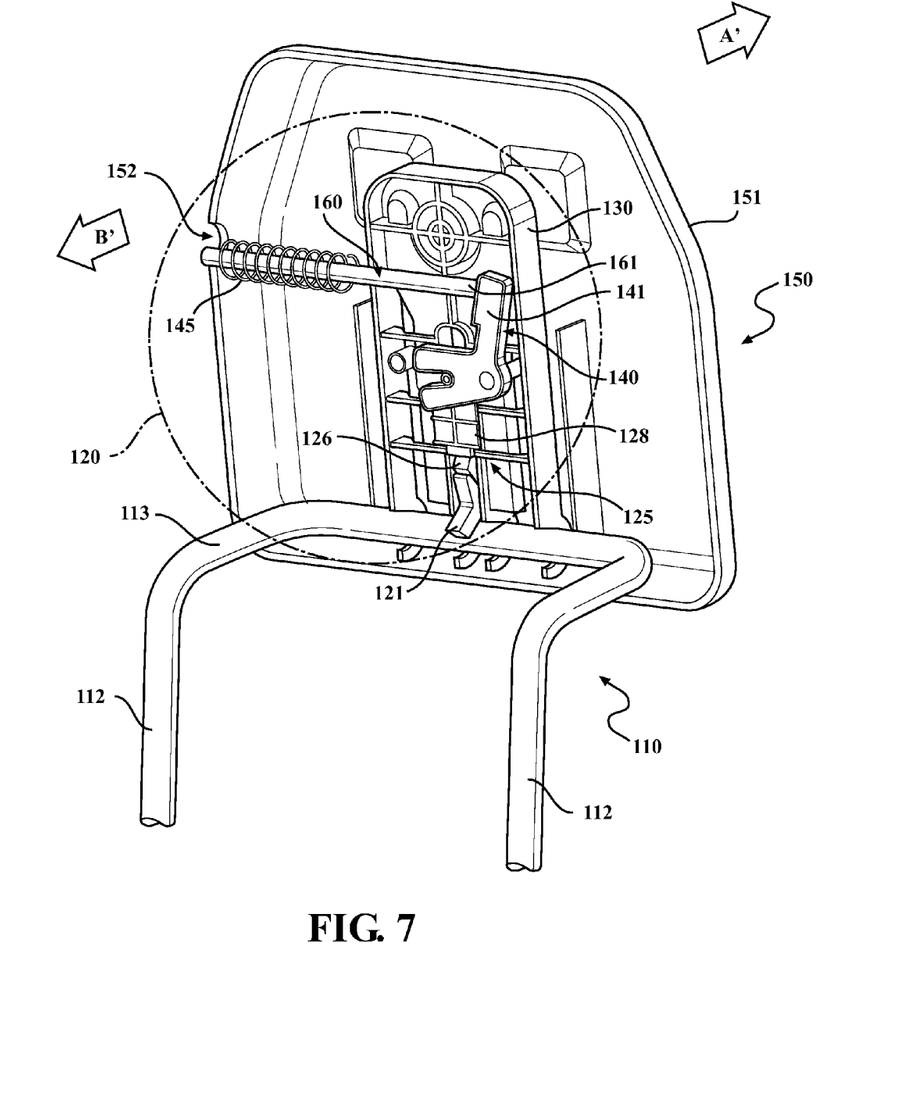
FIG. 7 is a perspective view of a second exemplary embodiment of the head restraint assembly of the present invention, with only a portion of the bun core structure depicted.
Figure 8:
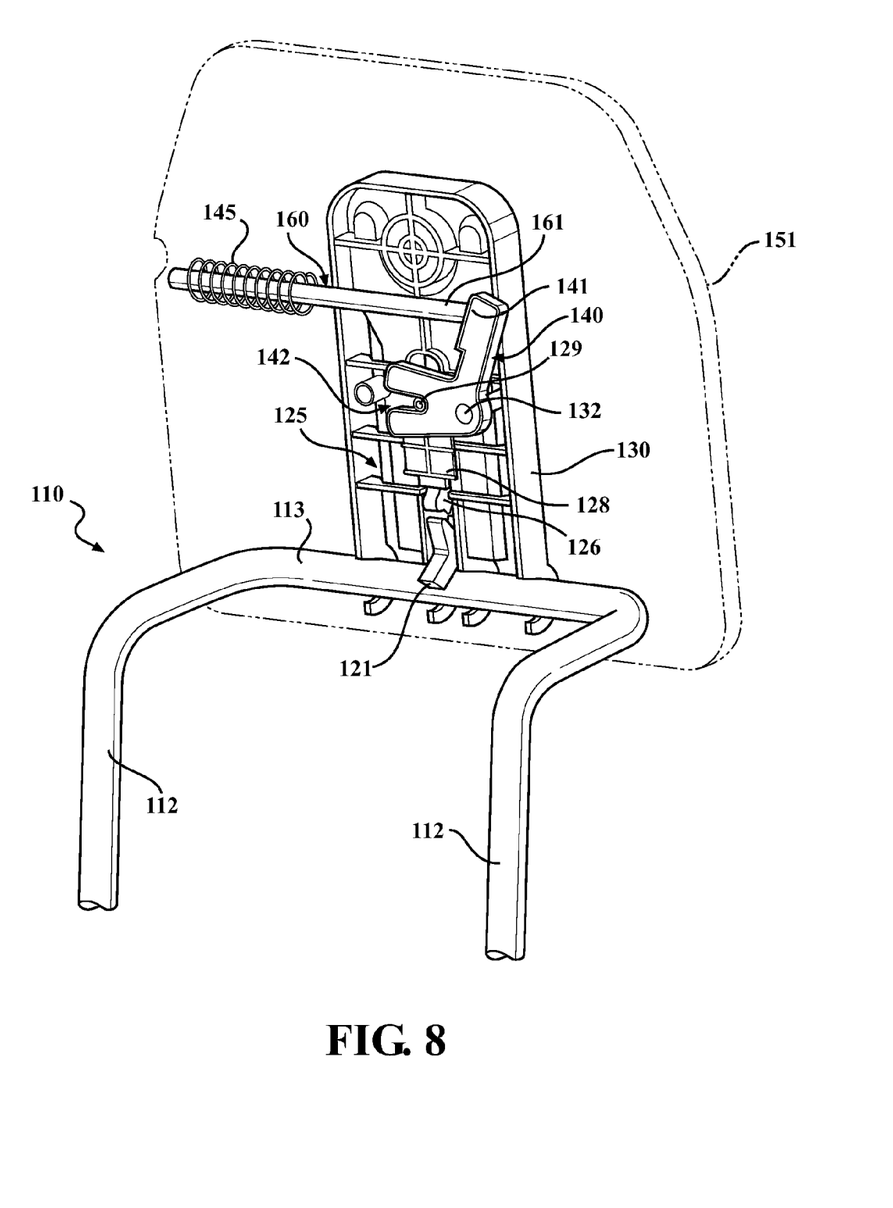
FIG. 8 is a perspective view of the head restraint assembly of FIG. 1, with only a portion of the bun core structure depicted.
Figure 9:
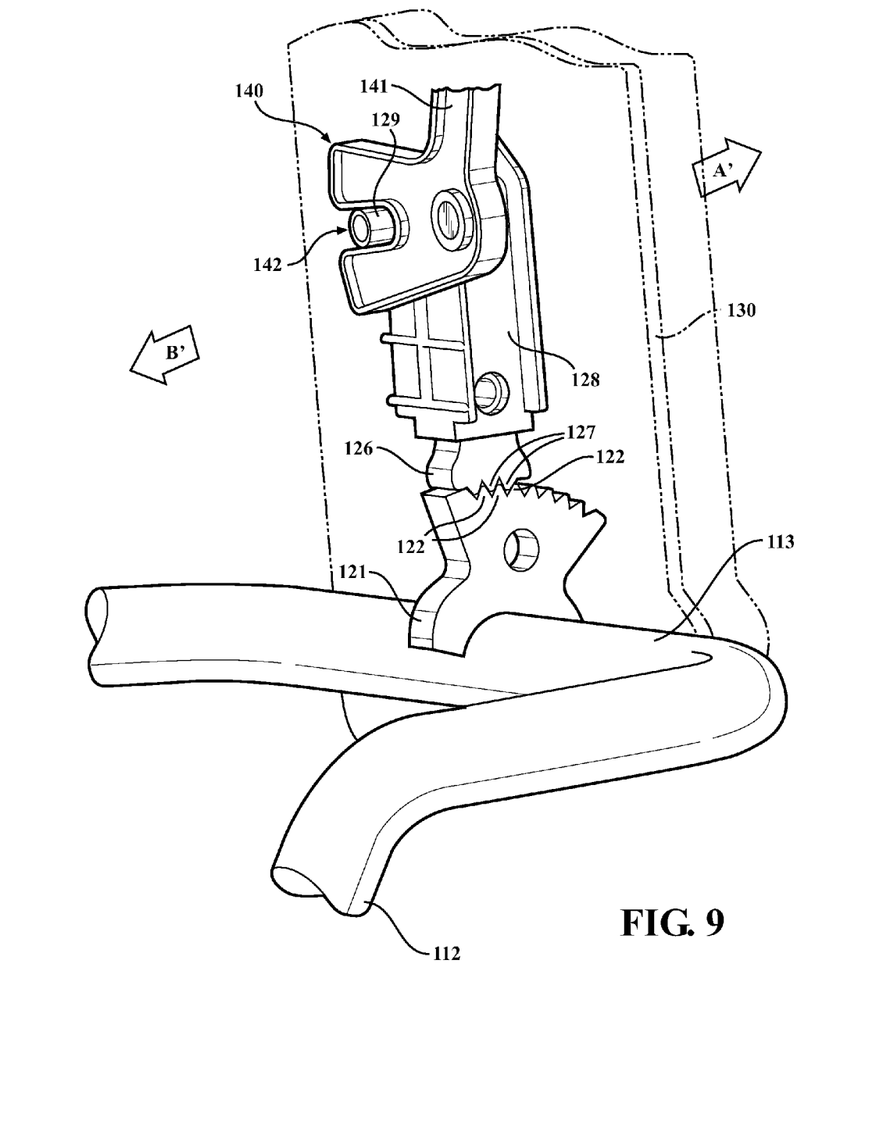
FIG. 9 is a detailed perspective view of the adjustment mechanism of the head restraint assembly of FIG. 7.

Turning next to FIGS. 7 through 9, the present invention according to a second exemplary embodiment is a head restraint assembly comprising a head restraint support (indicated generally at 110), a bun assembly (indicated generally at 150, which depicts one mateable half 151 of the core structure, and with the bun cover not shown) pivotally mounted on the head restraint support 110 for movement in forward, first A' and rearward, second B' directions relative to the head restraint support 110, and an adjustment mechanism (indicated generally within the circle 120 of FIG. 7 and described more fully below). As with the first embodiment, described above, the adjustment mechanism 120 permits selective pivotal movement of the bun assembly 150 in either of the first A' and second B' directions and, as the bun assembly 150 is moved in either of the first A' and second B' directions, the incremental positioning of the bun assembly 150 in any of a plurality of predefined positions along the path of travel of the bun assembly 150 in the first A' and second B' directions.

Except as described below, construction of the head restraint assembly of this second embodiment is essentially the same as that of the first embodiment.

Head restraint support 110 itself may be of conventional construction, comprising, as shown by way of example and not limitation, a generally U-shaped, monolithic structure including a pair of spaced-apart vertical supports 112 interconnected by a horizontally-disposed section 113. Per convention, the free ends (not visible) of supports 112 are received in head restraint guides (not depicted) provided in the top of the vehicle seat-back (not shown). Supports may be made of metal, polymer, polymer-coated metal or other materials suitable to the purpose.

In the embodiment of FIGS. 7 through 9, the adjustment mechanism 120 comprises a plurality of stationary teeth 122 provided on the head restraint support, the stationary teeth 122 defining the plurality of predefined positions along the path of travel of the bun assembly 15 in the first A' and second B' directions. More particularly according to the illustrated embodiment, the plurality of stationary teeth 122 are defined on a stationary toothed member 121, essentially the same as the stationary toothed member 20 of the first embodiment (see FIGS. 1 through 6D), fixed to the horizontally-disposed section 113 of head restraint support 110. The teeth 122 of the stationary toothed member define the plurality of predefined positions, as explained more fully below. A toothed pawl member (indicated generally at 125) comprises a pawl element 126 having a plurality of teeth 127, the pawl element 126 extending from a body 128. Body 128 is movably disposed in a track defined in a frame 130 positioned within the bun assembly 115. Body 128 is moveable in track between a first, engaged position (shown in FIG. 7), in which the teeth 127 of the pawl member 125 are engaged with the teeth 122 of the stationary toothed member 121, and a second, disengaged position (shown in FIG. 8), in which the teeth 127 of the pawl member 125 are disengaged from the teeth 122 of the stationary toothed member 121. A link member 140 is moveable between first and second positions, the first position characterized in that the link member 140 maintains the toothed pawl member 125 in the first position thereof, and the second position characterized in that the link member 140 moves the pawl member 125 into the second position thereof. Finally, an actuator (shown generally at 160) is operable by a user, such as the vehicle occupant, to move the link member 140 between the first and second positions thereof.

It will be understood that toothed pawl member 125 may be monolithic in construction, rather than comprising, as shown, a separate pawl element 126 connected to body 128.

Link member 140 is mounted to a post or axle 132 on the frame 130 so as to be rotatable relative thereto.

As depicted in FIGS. 7 and 8, the adjustment mechanism 120 is substantially disposed between mated halves of the core structure (only a first half 151 is shown, the opposite half being substantially identical). The core structure, which may be made of metal, polymer or other suitable material, comprises part of the bun assembly.

Actuator 160 is reciprocally moveably received through an opening 152 in the cover assembly. At its internal end 161, actuator is secured to a generally upwardly-projecting arm 141 of link member 140. A coil spring 145 is positioned over and secured to the actuator 160 and captured between the frame 130 and cover assembly. Coil spring 145 serves to bias both the actuator 160 and link member 140 to the default positions shown in FIG. 7.

A first end of the actuator 160 includes a "button" or other element that is accessible to the user through an opening in the bun assembly, the element being dimensioned to be pushed by a user's finger, for example.

With particular reference to FIGS. 7 through 9, link member 140 includes a generally V-shaped opening 142 therein, the opening 142 dimensioned to slidingly receive therein a guide element 129 projecting outwardly from the body 128. By virtue of this interconnection, rotational movement of link member 140 in response to actuation of the actuator 160 effects corresponding movement of the body 128 in the track defined in frame 130.

In operation, the head restraint assembly according to the above-described embodiment works as follows: With the bun assembly 150 in any given position, a user may depress the actuator 160. This action drives the actuator 160 inwardly against the biasing force of spring 145. By reason of the interconnection between actuator 160 and link member 140 at arm 141, actuator 140 is rotated clockwise about the post or axle 132. This rotational movement, in turn, causes the body 128 to be carried upwardly in the track defined in frame 130 by reason of the association of guide element 129 within the slot 142. As body 128 of pawl member 125 is moved upwardly, the pawl element 126 associated therewith is likewise moved upwardly, bringing the teeth 127 thereof out of engagement with the teeth 122 of the stationary toothed member 121. In this second position of the pawl member 125, the user can move the bun assembly in either the forward first A' or rearward second B' directions, incrementally adjusting the position of the bun assembly in either direction to any of the positions defined by the teeth 122 of the stationary toothed member 121. Once the bun assembly is in a desired position, the user simply releases the actuator 160, which returns to the biased position thereof by the action of spring 145. This motion, in turn, carries the link member 140 back to its first, default position, which likewise effects downward movement of the body 128 in the track defined in frame 130, thereby bringing the teeth 127 of pawl element 126 back into engagement with the teeth 122 of stationary toothed member 121 to once again fix the position of the bun assembly.

The above description is of preferred embodiments. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The invention in which an exclusive property or privilege is claimed is defined as follows:

1. A head restraint assembly, comprising:
   a support for mounting the head restraint above a seat back;
   a bun assembly pivotally mounted on a head restraint support for movement in first and second directions relative to the head restraint support; and
   an adjustment mechanism disposed at least substantially within the bun assembly, the adjustment mechanism operative to permit (i) the selective pivotal movement of the bun assembly in either of the first and second directions and, as the bun assembly is moved in either of the first and second directions, (ii) the incremental positioning of the bun assembly in any of a plurality of predefined positions along a path of travel of the bun assembly in the first and second directions, wherein the adjustment mechanism comprises:
   (a) a plurality of stationary teeth provided on the head restraint support, the stationary teeth defining the plurality of predefined positions along the path of travel of the bun assembly in the first and second directions;
   (b) a toothed pawl member movably mounted at a first location within the bun assembly and moveable between an engaged position, in which one or more of the teeth of the pawl member are engaged with one or more of the stationary teeth, and a disengaged position, in which the teeth of the pawl member are disengaged from the stationary teeth; and (c) a link member pivotally mounted at a second location within the bun assembly for movement between first and second positions and biased to the first position thereof, the first position characterized in that the link member contacts the toothed pawl member to maintain the toothed pawl member in the engaged position thereof, and wherein, during movement of the link member into the second position, the link member contacts the toothed pawl member and moves the toothed pawl member into the disengaged position thereof; and (d) a selectively moveable actuator comprising a cam surface which acts to move the link member between the first and second positions thereof when the actuator is moved.

2. The head restraint assembly of claim 1, wherein:
the actuator is rectilinearly moveable in first and second directions;
the link member is rotatably moveable, in a plane generally normal to the axis of the rectilinear movement of the actuator, between the first and second positions thereof; and
a portion of the link member co-acts with the cam surface of the actuator during rectilinear movement thereof in the first and second directions to effect movement of the link member between the first and second positions thereof.

3. The head restraint assembly of claim 1, wherein the plurality of stationary teeth provided on the head restraint support are defined on a stationary toothed member provided on the head restraint support.

4. The head restraint assembly of claim 3, wherein the stationary toothed member includes an opening shaped to conform to a portion of a surface of the head restraint support.

5. The head restraint assembly of claim 4, wherein the stationary toothed member and the head restraint are made of metal, and the stationary toothed member is welded to the head restraint.

6. The head restraint assembly of claim 1, wherein:
the toothed pawl member is rotatably moveable between the engaged and disengaged positions thereof, and includes an arm portion;
the link member is rotatably moveable between the first and second positions thereof; and
wherein, in movement of the link member from the first position to the second position thereof, the link member abuts the arm of the pawl member to urge the pawl member to the disengaged position thereof.

7. The head restraint assembly of claim 1, further comprising a frame assembly on which is carried the link member, actuator, and pawl member.

8. The head restraint assembly of claim 7, wherein the frame assembly comprises at least first and second, spaced-apart plate members, each plate member pivotally mounted on the head restraint support; and wherein further the link member and pawl member are rotatably disposed on the same one of the at least first or second plate members, and the actuator extends between the at least first and second plate members and is rectilinearly moveable relative thereto.

9. The head restraint assembly of claim 1, further comprising a spring which biases the link member to the first position thereof.

* * * * *